United States Patent
Furst

(10) Patent No.: US 7,738,791 B2
(45) Date of Patent: Jun. 15, 2010

(54) TRANSMITTER AND METHOD FOR TRANSMITTING MESSAGES ON AN OPTICAL FIBER

(75) Inventor: Cornelius Furst, Auenwald (DE)

(73) Assignee: Ericsson, AB, Stockholm (SE)

( * ) Notice: Subject to any disclaimer, the term of this patent is extended or adjusted under 35 U.S.C. 154(b) by 960 days.

(21) Appl. No.: 10/543,712

(22) PCT Filed: Jan. 21, 2004

(86) PCT No.: PCT/IB2004/000711

§ 371 (c)(1),
(2), (4) Date: Feb. 10, 2006

(87) PCT Pub. No.: WO2004/068268

PCT Pub. Date: Aug. 12, 2004

(65) Prior Publication Data

US 2006/0177221 A1    Aug. 10, 2006

(30) Foreign Application Priority Data

Jan. 28, 2003    (DE) .................. 103 03 313

(51) Int. Cl.
*H04J 14/02*    (2006.01)
*H04B 10/04*    (2006.01)

(52) U.S. Cl. ..................... 398/94; 398/79; 398/91; 398/92; 398/93; 398/95; 398/140; 398/158; 398/159; 398/182; 398/192; 398/193; 398/194; 398/196; 398/197

(58) Field of Classification Search ............ 398/94, 398/79, 91, 92, 93, 95, 140, 158, 159, 182, 398/192, 193, 194, 196, 197
See application file for complete search history.

(56) References Cited

U.S. PATENT DOCUMENTS

| 5,692,082 A | * | 11/1997 | Fukushima ................ 385/88 |
| 5,907,420 A |   | 5/1999  | Chraplyvy et al. |
| 5,909,305 A | * | 6/1999  | Kinoshita ................ 359/337.1 |
| 6,275,313 B1 |  | 8/2001  | Denkin et al. |
| 6,324,318 B1 |  | 11/2001 | Suzuki |
| 2002/0054733 A1 | | 5/2002 | Kagi et al. |
| 2002/0101634 A1 | * | 8/2002 | Ye ............................. 359/122 |
| 2002/0181061 A1 | | 12/2002 | Uda et al. |

FOREIGN PATENT DOCUMENTS

| DE | 100 40 790 A1 | 3/2002 |
| EP | 1 164 737 A1  | 12/2001 |
| EP | 1 213 865 A1  | 6/2002 |
| WO | WO 99/29057   | 6/1999 |
| WO | WO 00/72479 A1 | 5/2000 |

* cited by examiner

*Primary Examiner*—Ken N Vanderpuye
*Assistant Examiner*—Daniel G Dobson
(74) *Attorney, Agent, or Firm*—Kirschstein, et al.

(57) ABSTRACT

For transmitting information on an optical fiber, a plurality of information carrier channels at different carrier frequencies and a plurality of filling channels are used. The filling channels are transmitted together with the information carrier channels along the fiber. The total optical power of the information carrier channels and the filling channels transmitted on the fiber is maintained constant by compensating every change of the optical power of the information carrier channels by an inverse change of the optical power of the filling channels. The change of the optical power of the filling channels is distributed to the individual filling channels such that a minimum displacement of the center of gravity of the common spectrum of information carrier channels and filling channels results.

19 Claims, 4 Drawing Sheets

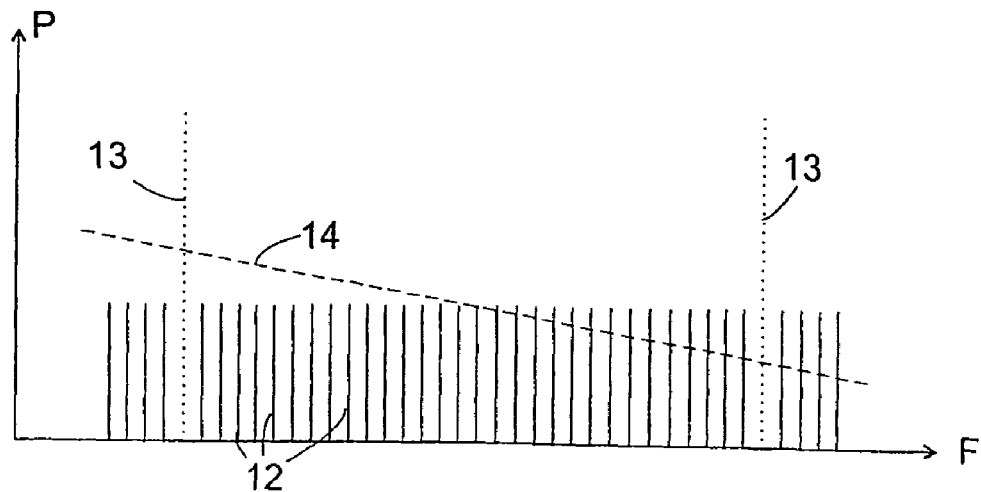
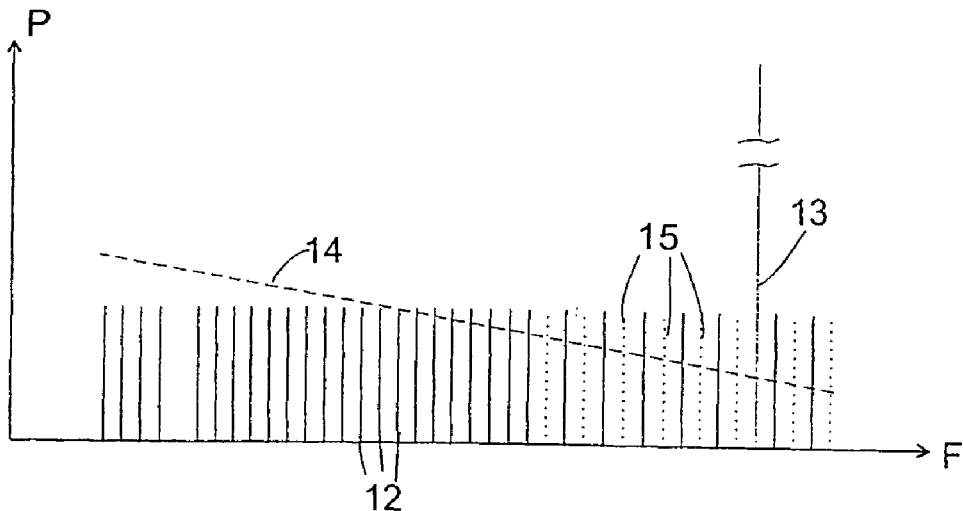
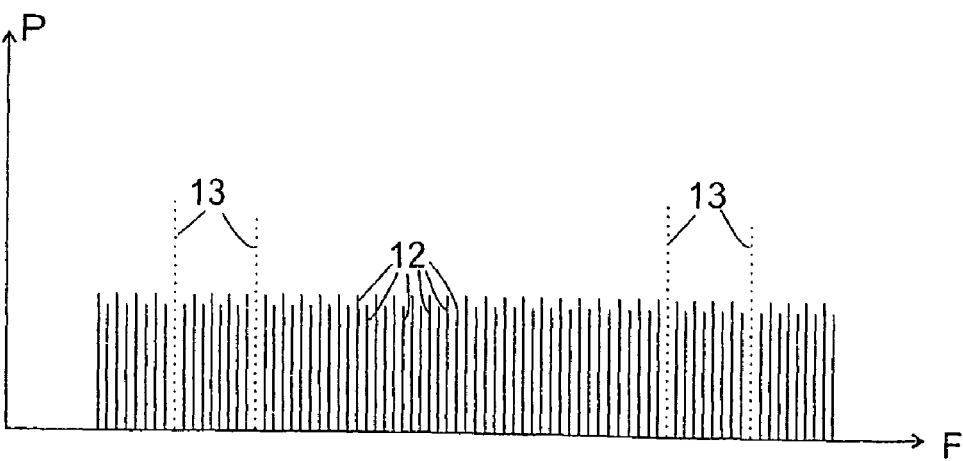

TRANSMITTER AND METHOD FOR TRANSMITTING MESSAGES ON AN OPTICAL FIBER

The present invention relates to a transmitter and to a method for transmitting information on an optical fibre using several carrier frequencies.

Information signals transmitted on an optical fibre are subject to attenuation, which makes it necessary, in case of long transmission distances, to reamplify the signals at regular intervals in order to ensure that they reach a receiver with sufficient power. In such an amplifier all carrier frequencies transmitted on the fibre are amplified simultaneously. To this effect, it is necessary that the gain of the amplifier is as closely identical as possible for all carrier frequencies used, so that even after multiple amplification the ratio of the powers of the various carrier waves with respect to each other is not substantially shifted. As long as the powers of the carrier waves are constant, this problem may be solved by an appropriate choice of the frequency band of the carrier waves and of the type of amplifier. Problems occur, however, if the power of the individual carrier waves varies abruptly. If in a single fibre of a branched optical communication network one or more carrier frequencies disappear suddenly, e. g. due to an automatic protection function or due to a technical failure at another location of the network, this causes the gain for the remaining carrier waves to increase. This increase becomes more pronounced still if the optical fibre comprises several amplifiers. Extremely fast and strong intensity jumps may be caused, which may lead to failures in the evaluation of the communication signals conveyed by the concerned carrier waves at the receiver. In the worst case, these failures may cause an automatic protection function to be activated and to switch off the concerned carrier waves. In this way, the is failure propagates to other regions of the network, and a catastrophic breakdown may be caused.

In order to cope with this problem, it has been proposed, e. g. in U.S. Pat No. 5,907,420 and U.S. Pat. No. 6,275,313, to transmit on an optical fibre, along with a plurality of information carrier channels at different carrier frequencies, a plurality of filling channels which are in general not used for transmitting information, but whose essential purpose is to compensate power variations which result from switching on and off individual information carrier channels. I. e., if an information carrier channel fails, this is detected, and the optical power of the filling channels is readjusted so that the total optical power of information carrier channels and filling channels remains constant. Abrupt changes of the gain of the information carrier channels are thus avoided.

U.S. Pat. No. 5,907,420 suggests to use wavelengths for the filling channels outside the frequency band used for the information carrier channels, in order to maintain the bandwidth thereof unimpaired.

U.S. Pat. No. 6,275,313 also considers the possibility of using several filling channels at different frequencies and to locate these frequencies within the band of the information carrier channels.

A problem which is related to the use of the filling channels and which is discussed already in U.S. Pat. No. 6,275,313 is the so-called Raman tilt. Optical fibres in communication networks are usually operated at high optical powers, in order to be able to make the distance between two amplifiers as long as possible. An upper limit of the optical power that can be conveyed on a fibre is given by the onset of non-linear optical effects which corrupt the spectrum and the impulse shape of the optical signals conveyed. One of these effects is stimulated Raman scattering, which may be understood as inelastic scattering of light by lattice vibrations of the fibre material. This effect mainly causes a spectral shift of the optical signals to lower frequencies, so that in the course of the propagation of a multiplex formed of a plurality of carrier frequencies in an optical fibre, the high frequency components of the multiplex lose energy and the low-frequency components gain energy. This displacement of the energies is not compensated if the multiplex passes an amplifier inserted in the fibre, so that at the end of the fibre the signal-noise ratio of the high carrier frequencies is deteriorated by Raman scattering out of the high frequencies. Under stationary conditions this fact may be taken account of by an appropriate processing of the information carrier channels at the receiver. However, if individual information carrier channels fail and their power is substituted by the filling channel, the signal-noise ratio of the individual information carrier channels varies abruptly, and receiving perturbations are caused.

The object of the present invention is to minimize such perturbations resulting from jumps of the signal-noise ratio. To this effect it is necessary to minimize the changes of the Raman tilt which result from the disappearance or appearance of information carrier channels on the optical fibre and the corresponding adaptation of the power of the filling channels. To this effect it is suggested to use a plurality of filling channels and to distribute a change of the optical power of the filling channels which becomes necessary due to a change of the power of the information carrier channels to the individual filling channels such that a minimum displacement of the centre of gravity of the common spectrum of information carrier channels and filling channels results.

Such a spectral centre of gravity may e. g. be defined as a power-weighted average frequency $$\overline{f} = \sum_n p_n f_n / P,$$

the index n extending over all carrier channels and filling channels, $p_n$ being the optical power and $f_n$ the frequency of the channel n, and $$P = \sum_n P_n$$

being the total optical power of the information carrier channels and the filling channels. Quite equivalently, the centre of gravity may also be calculated referring to the wavelength according to the formula $$\overline{\lambda} = \sum_n P_n \lambda_n / P,$$

wherein $\lambda_n$ denotes the wavelength of channel n.

According to a first embodiment, the frequencies of the filling channels may be selected outside a frequency band used for the information carrier channels. This has the advantage that the transmission capacity of the frequency band is not impaired by the introduction of the filling channels. A disadvantage is, however, that the amplifiers that are used in a long-range optical connection generally have less gain outside such a carrier frequency band than within the frequency band, and this must be taken account of when controlling the energy of the filling channels.

From the point of view of implementation, it is therefore much simpler to use for a filling channel a frequency inside the carrier frequency band, so that the same gains as for the information carrier channels apply for the filling channels. Preferably, in this case the common spectrum of information carrier channels and filling channels is formed of regularly spaced lines which belong either to an information carrier channel or to a filling channel; i. e. filling channels are fitted into gaps of a frequency band which is otherwise uniformly studded with information carrier frequencies. It is also possible to select only individual lines from a spectrum of uniformly spaced lines as information carrier and filling channels, respectively.

Since the number of filling channels will generally be much less than that of the information carrier channels, the compensation of the failure of several information carrier channels may require a power of a filling channel which is a multiple of the typical power of an information carrier channel. Such high powers in a narrow frequency range promote the occurrence of disturbing non-linear effects such as four-wave mixing. In order to limit the four-wave mixing, it is useful to convey unpolarized light on the filling channels, i. e. on each filling channel two orthogonal polarization states may propagate, which are not coherent with each other and can therefore only contribute individually to non-linear processes.

For improving the failure safety of the filling channels, it is useful to employ redundant radiation sources, preferably two radiation sources, for each filling channel. These radiation sources are preferably polarized orthogonally, in order to obtain unpolarized light on the filling channel and thus to achieve the advantages related thereto, as described above.

Preferably, in normal operation, the two radiation sources are operated at equal output power.

If one of these radiation sources fails, one may be satisfied just to maintain the total optical power on the fibre constant and to accept a certain displacement of the centre of gravity, which is associated to an increase of power of the other filling channels. Preferably, however, each radiation source of the filling channels has a sensor for detecting a failure of the radiation source associated to it. If the failure of one radiation source of a filling channel is detected using such a sensor, it is possible to double the output power of the remaining radiation source of the same filling channel, in order to maintain the total optical power on the fibre constant and, at the same time, to avoid a displacement of the centre of gravity of the spectrum.

The method described above may be carried out on the entire set of information carrier and filling channels that are transmitted in a given optical fibre, or it may be carried out in a group of channels selected from this set.

It may also be useful to divide the entire set of the channels into a first, a second, and maybe further groups of information carrier and filling channels and to carry out the method described above in one group of information carrier and filling channels independently from the other. This is particularly advantageous if the groups cover different frequency ranges.

Further features and advantages of the invention become apparent from the subsequent description of embodiments referring to the appended figures.

FIG. 3 is a schematic spectrum of a wavelength-multiplex signal input into an optical fibre by such an output portion;

FIG. 4 is a corresponding wavelength-multiplex signal in case of a failure or in case of an underload of said output portion;

FIG. 5 is a schematic spectrum of the output portion in an advanced state of completion.

Figure 1:
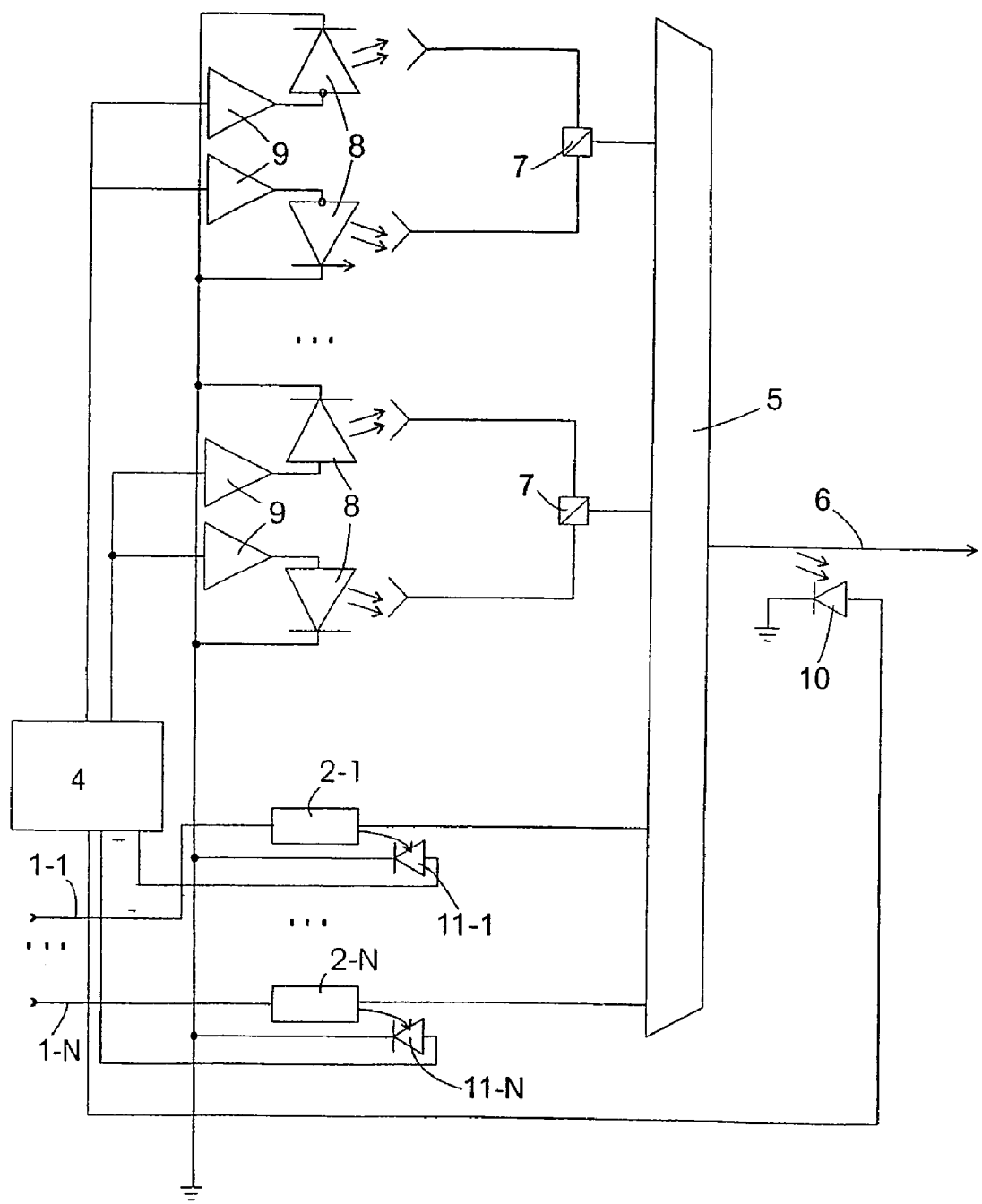
FIG. 1 is a block diagram of an output portion of an optical network node according to a first embodiment of the invention.

The output portion shown in FIG. 1 is part of a network node of an optical communication network, in particular of a telephone network. Such a network node is connected to a plurality of other network nodes or terminals by optical fibres. The optical fibres are operated in wavelength multiplex, i. e. they convey a plurality of carrier waves of different frequencies, which have information signals modulated onto them independently from one another. These carrier waves are also referred to as information carrier channels. The network node may be subdivided into an input portion, a switching fabric and an output portion, the input portion comprising an optical demultiplexer for spectrally decomposing a multiplex signal arriving in an optical fibre into its individual channels and passes the information carrier channels to the optical switching fabric. The optical switching fabric has a first group of outputs which lead to the output portion of the network node, and a second group of outputs which are connected to optical-electrical signal converters. The optical switching fabric forwards an information carrier channel directly to a multiplexer of the output portion if the frequency of the corresponding channel is available on the optical fibre connected to the multiplexer. If this is not the case, the information carrier channel is forwarded to an optical-electrical converter via an output of the second group. The electrical information signal provided by this converter is used for driving an electrical-optical converter which is connected to an input of the switching fabric and which provides a carrier frequency which is still available on the output fibre. The switching fabric, in turn, passes this signal to the multiplexer of the output portion.

FIG. 1 schematically shows the design of such an output portion according to a first embodiment of the invention.

Wave guides 1-1 to 1-N are connected to outputs of the switching fabric and supply an information carrier channel to a coupler 2-1, . . . , 2-N. The frequencies of the information carrier channels are all different. Typically, they are arranged at a distance of 100 GHz from one another.

Each of the couplers 2-1, . . ., 2-N has two outputs, a first one by which a small fraction of the power of the input information carrier channel is supplied to a photodiode 11-1, . . . , 11-N, and a second, by which an optical multiplexer 5 receives the major portion of the power of the information carrier channel.

In addition to its N inputs connected to the couplers 2-1, . . . , 2-N, the wavelength multiplexer 5 has two inputs which are connected to two laser diodes 8 by polarisation beam splitters 7. The two laser diodes connected to a beam splitter 7 are tuned to the same frequency and are polarized orthogonally with respect to each other, so that they are able to introduce unpolarized light into the wavelength multiplexer 5. The frequencies of the pairs of laser diodes 8 are in gaps of the sequence of the frequencies of the information carrier channels, at a distance of 100 GHz from the adjacent information carrier channels. Each laser diode 8 receives a supply current which is not modulated by an information signal from a driver 9, the output level of which is controlled by control circuit 4. The output power of the laser diodes 8 depends on the supply currents they receive and may be a multiple of the power of an information carrier channel.

A first photodiode 10 is located at the connection of optical fibre 6 to the output of wavelength multiplexer 5, in order to monitor the total optical power supplied by the latter, which is composed of contributions of all information carrier channels and the laser diodes. The photodiode 10 is connected to an input of control circuit 4. By means of the photodiode 10 the control circuit 4 is capable of recognizing whether the total optical power of the transmitter differs from a desired value which is necessary for obtaining a balanced amplification of the individual information carrier channels in amplifiers located along the optical fibre 6. By means of the photodiodes 11-1 to 11-N, it is further capable of recognizing the information carrier channels, by whose sudden disappearance or appearance a change of the total optical power is caused. Based on this information, the control circuit 4 controls the output power of the laser diodes 8.

For illustrating the control method, reference is made to FIGS. 3 and 4. FIG. 3 shows a typical spectrum of a wavelength multiplex input into the optical fibre 6 by the transmitter of the invention. It is formed of N=38 lines 12 at essentially equal power p, which correspond to the carrier waves supplied by the laser diodes 3-1 to 3-N. In the high-and low-frequency border regions, the spectrum of the carrier waves has two gaps, where the frequencies of the filling laser diodes 8 are located. Their lines 13 are shown in phantom on the Fig., in order to illustrate that their power is variable and that in the case shown, where all carrier laser diodes 3-1 to 3-N are active, it may vanish. The Raman tilt, discussed above already, which occurs during the propagation of the wavelength multiplex on the optical fibre 6, causes the multiplex to reach an intermediate amplifier located in the fibre 6 with a distorted spectrum corresponding to the dashed line 14, in which the high-frequency lines of the multiplex are attenuated and the low-frequency ones, in comparison, are boosted.

FIG. 4 shows an analogous spectrum representing the case that some of the information carrier channels, represented here by phantom lines 15, have failed. The loss of power caused thereby in the high-frequency range of the spectrum causes a displacement of the characteristic 14 of the Raman tilt towards low frequencies, i. e. the attenuation and the boost, respectively, of the individual information carrier channels changes, and there are channels which are boosted in case of the complete spectrum of FIG. 3 and which undergo attenuation in the spectrum of FIG. 4. In order to thwart this effect, in case of failure of one or more carrier channels the control circuit 4 distributes the optical power of the filling laser diodes 8 required for maintaining constant the total optical power on fibre 6 to the two filling frequencies such that the centre of gravity of the spectrum, defined by the formula $$\bar{f} = \sum_n P_n f_n / P,$$

varies as little as possible.

If only two filling frequencies are used, as in the present embodiment, it is not always possible to fulfill this requirement exactly; in such a case the control circuit 4 selects the distribution of the power to the filling laser diodes which minimizes the displacement of the centre of gravity $\bar{f}$.

In the case shown in FIG. 4 of the failed carrier channels all being in the high-frequency range of the spectrum, the high-frequency pair of filling laser diodes 8 is driven by control circuit 4 in order to replace the power of the failed carrier channels.

In this way, in the high-frequency range of the multiplex spectrum, there is sufficient energy available again to compensating the displacement of the characteristic 14 of the Raman tilt.

In the above description it has been assumed that at the output of multiplexer 5 the powers of all information carrier channels are equal. In order to cope with the consequences of the Raman tilt, it obviously also possible to make the power of the higher-frequency ones among these carrier channels at the output of multiplexer 5 higher than those of the lower-frequency ones using amplifiers or attenuators located before the inputs of the multiplexer 5 in order to make the carrier channels reach an amplifier of optical fibre 6 with equal powers or at least with a smaller decrease of power towards higher frequencies. In this way the signal quality at the output of fibre 6 may be increased somewhat, but the sensitivity for switching on and off individual channels of the multiplex remains.

The optical power transmitted on one of the filling channels of optical fibre 6 can be a multiple of the power on one of the information carrier channels, in particular if the filling channels have to compensate by their power the failure of several information carrier channels. Since the power conveyed in the filling channels is distributed between two orthogonal polarization states, this does not cause an excessive increase of four-wave mixing and other disturbing non-linear effects.

If in a pair of filling laser diodes 8 of equal frequency one diode 8 fails, the control circuit 4 notices this based on the total optical power input into fibre 6, detected by the photodiode 10. It reacts acts thereupon by driving the drivers 9 of both filling laser diode pairs 8 more strongly. This drive is adjusted until the desired value of the optical output power is reached again. In this way the output powers of the still intact filling laser diodes are increased by a same factor so far that the desired power is reached again on fibre 6. A displacement of the spectral centre of gravity of the multiplex resulting therefrom is accepted for the sake of simplicity. Even if one of the drivers 9 or of the laser diodes 8 reaches saturation power when readjusting the power of the filling channels, by simply driving more strongly, the non-saturated filling laser diodes 8 may be made to deliver more power until the desired total power is reached again.

Figure 2:
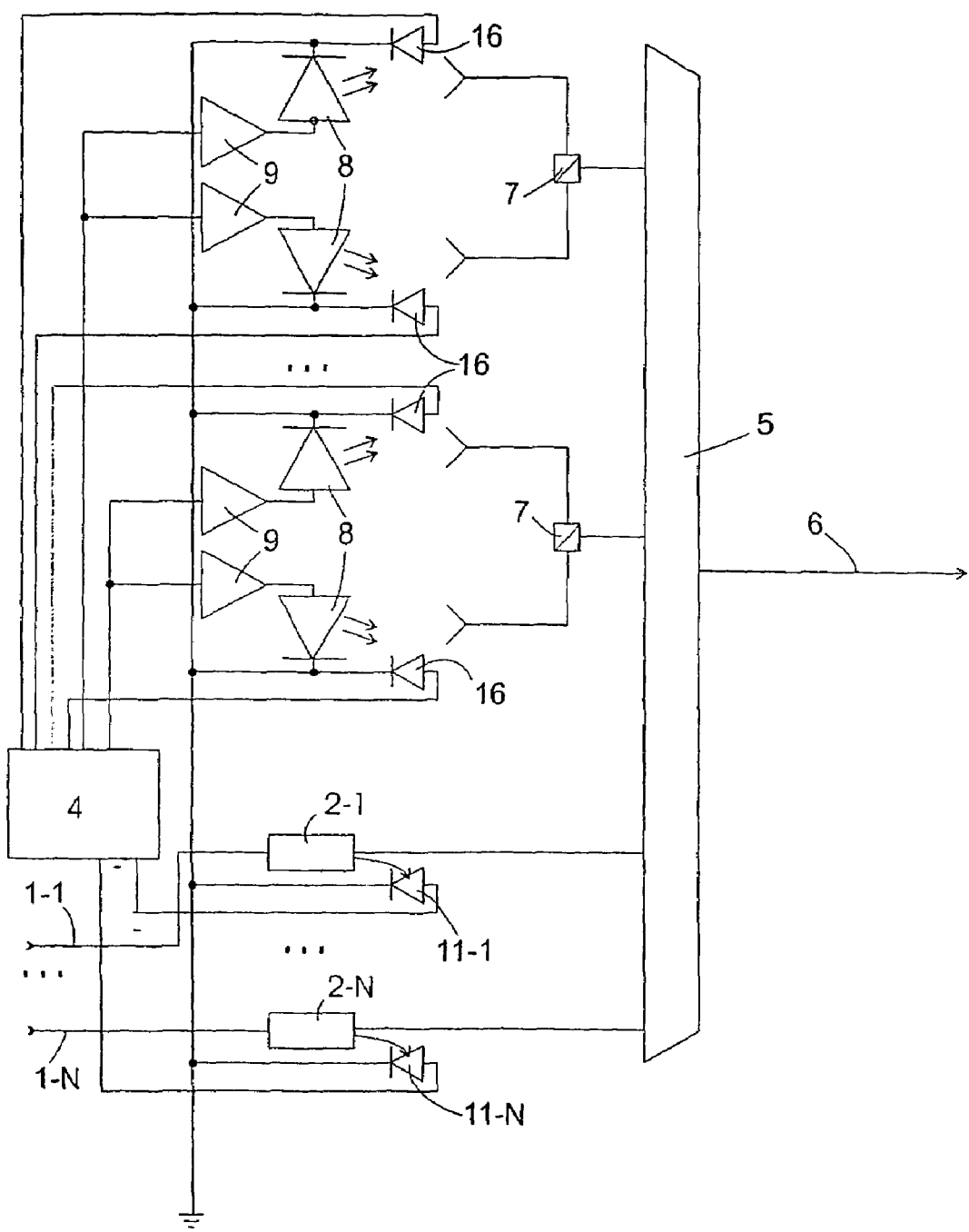
FIG. 2 is a block diagram of an output portion according to a second embodiment of the invention.

FIG. 2 shows a second embodiment of the output portion of a network node according to the invention, in which also the filling laser diodes 8 have photodiodes 16 associated to them for monitoring their output power. In this embodiment, the photodiode 10 at the coupling point between the wavelength multiplexer 5 and the optical fibre 6 may be cancelled, if the other photodiodes 11-1, . . . , 11-N, 16 are precise enough to enable the control circuit 4 to calculate the total power on the fibre 6 by adding their measured values. The advantage of this embodiment is that in case of failure of a filling laser diode 8 the control circuit 4 is able to identify the failed filling laser diode 8 and to compensate the associated loss of total power by driving more strongly the filling laser diode 8 which is paired with the failed one, in order to double its output power. In this way, a displacement of the spectral centre of gravity of the multiplex can be avoided. Only if such a doubling exceeds the rated power of the concerned filling laser diode, the control circuit 4 increases also the power of the remaining filling laser diodes.

While in the above example of N=38 information carrier channels two filling channels may be sufficient, in case that larger numbers of carrier frequencies are used, the problem arises that the filling laser powers necessary for maintaining the total optical power constant may become so large that even in spite of lacking polarization of the filling channels, four-wave mixing becomes a nuisance. In case of larger numbers of information carrier channels in the multiplex, one will to advantage also provide a corresponding larger number of filling channels. I. e. when passing from a multiplex having the spectrum shown in FIG. 3 to an 80-channel multiplex having channel distances of 50 GHz, as represented in the spectrum of FIG. 5, one will specify two of the additional forty channels as filling channels. The existence of a larger number of filling channels has the advantage that the additional filling channels may be used for compensating not only the failure of the new, but also of the initial information carrier channels. In this way, additional degrees of freedom in compensation are obtained, i. e. there may be several distributions of the filling power to the individual filling lasers, which allow to compensate the failure of an information carrier channels without displacing the centre of gravity of the spectrum. Among these different possibilities, the preferred one may e. g. be the one which has the most uniform distribution of the power to the filling lasers and which thus minimizes perturbations due to four-wave mixing.

Figure 6:
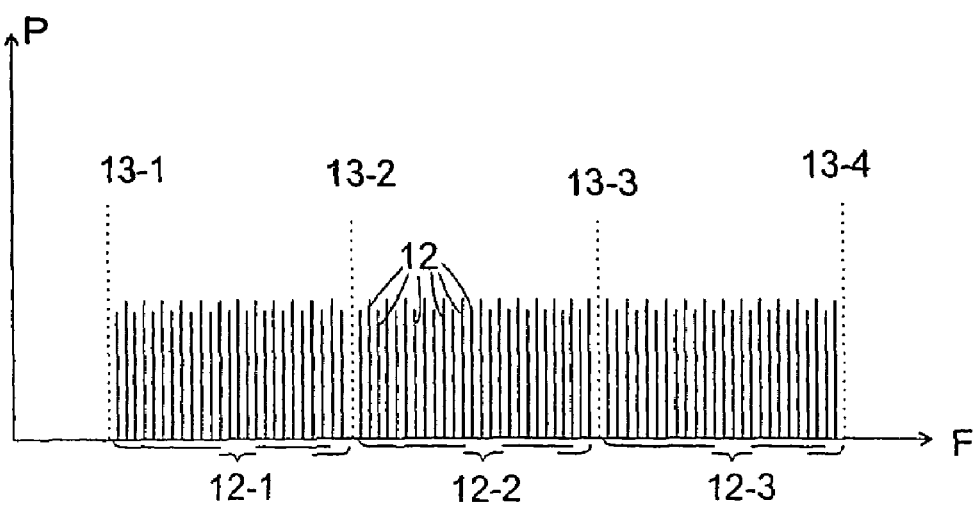
FIG. 6 is a further spectrum for illustrating a modification of the method of the invention.

FIG. 6 shows a further spectrum of information carrier channels 12 and filling channels 13-1, 13-2, 13-3, 13-4 in an optical fibre. The filling channels divide the information carrier channels into three groups 12-1, 12-2, 12-3, which occupy spectral ranges separated from each other by the filling channels 13-2, 13-3. If in one of the spectral ranges 12-1 to 12-3 one or more information carrier channels fail, this may be compensated while maintaining the power and the spectral centre of gravity of the concerned group by readjusting the power of the two filling channels that are immediately adjacent to the concerned group. If in each group failures are compensated in this way independently from the other groups, it may be concluded that for the entirety of the channels transmitted on the fibre, power and spectral centre of gravity remain constant. Power of the filling channels 13-2, 13-3 located between two groups of information carrier channels is the sum of the powers that would be required for compensating one of the two adjacent groups.

The invention claimed is:

1. A method of transmitting information on an optical fiber comprising the steps of: using a plurality of information carrier channels at different carrier frequencies and a group of filling channels, conveying the filling channels together with the information carrier channels along the fiber, maintaining a total optical power of the information carrier channels and the filling channels transmitted on the fiber constant by compensating each change of the optical power of the information carrier channels by an inverse change of the optical power of the filling channels, and distributing the change of the optical power of the filling channels onto the individual filling channels such that displacement of a center of gravity of a common spectrum of the information carrier channels and the filling channels is reduced to a minimum, the filling channels having frequencies located outside of a frequency band which is used for the information carrier channels.

2. The method of claim 1, characterized in that the optical powers of the filling channels are continuously adapted.

3. The method of claim 1, characterized in that the common spectrum of the information carrier channels and the filling channels is formed of equidistant lines which belong to one of an information carrier channel and a filling channel.

4. The method of claim 1, characterized in that the information carrier channels and the filling channels have frequencies selected from a spectrum of equidistant lines.

5. The method of claim 1, characterized in that unpolarized light is transmitted in the filling channels.

6. The method of claim 5, characterized in that the light transmitted in each filling channel is generated by two radiation sources.

7. The method of claim 6, characterized in that the two radiation sources generate orthogonally polarized light.

8. The method of claim 6, characterized in that the two radiation sources are operated at equal output power.

9. The method of claim 8, characterized in that in case of a failure of one of the two radiation sources the other one is operated at doubled output power.

10. The method of claim 1, characterized in that the filling channels are coupled into the optical fiber by a wavelength multiplexer.

11. A method of transmitting information on an optical fiber comprising the steps of: using a set of information carrier channels at different carrier frequencies and a set of filling channels, transmitting the filling channels together with the information carrier channels along the fiber, dividing the set of the information carrier channels and the set of the filling channels into a first group and a second group, and for the first group, maintaining a total optical power of the information carrier channels and the filling channels transmitted on the fiber constant by compensating each change of the optical power of the information carrier channels by an inverse change of the optical power of the filling channels, and distributing the change of the optical power of the filling channels onto the individual filling channels such that displacement of a center of gravity of a common spectrum of the information carrier channels and the filling channels is reduced to a minimum, the filling channels having frequencies located outside of a frequency band which is used for the information carrier channels.

12. The method of claim 11, characterized in that the steps carrier out for the first group are also performed for the second group.

13. The method of claim 11, characterized in that the information carrier channels of the first group are located on one side, and the information carrier channels of the second group are located on the other side, of a limit frequency.

14. A transmitter for an optical information transmission system, comprising: a plurality of modulatable light sources modulated by an information signal, a plurality of filling light sources connected in common to a port for an optical fiber, a sensor for monitoring a total optical power of the modulatable light sources and the filling light sources provided at said port, and a control circuit for controlling the optical power of the filling light sources such that the total optical power does substantially not vary, the control circuit being operative to control the optical power of the filling light sources such that displacement of a spectral center of gravity of the total optical power is reduced to a minimum, the filling light sources having frequencies outside a frequency band of the modulatable light sources.

15. The transmitter of claim 14, characterized in that a spectrum of the total optical power is formed of equidistant lines which are generated by one of a modulatable light source and a filling light source.

16. The transmitter of claim 14, characterized in that the filling light sources provide unpolarized light.

17. The transmitter of claim 14, characterized in that each filling light source is formed of two individual light sources.

18. The transmitter of claim 17, characterized in that the individual light sources are polarized orthogonally.

19. The transmitter of claim 17, characterized in that each individual light source has a sensor associated to it for detecting a failure of the light source.

* * * * *

UNITED STATES PATENT AND TRADEMARK OFFICE
CERTIFICATE OF CORRECTION

PATENT NO. : 7,738,791 B2
APPLICATION NO. : 10/543712
DATED : June 15, 2010
INVENTOR(S) : Furst Page 1 of 1

It is certified that error appears in the above-identified patent and that said Letters Patent is hereby corrected as shown below:

In Column 1, Line 34, delete "the is" and insert -- the --, therefor.

In Column 2, Lines 45-46, delete " $P = \sum_n P_n$ " and insert -- $P = \sum_n P_n$ --, therefor.

In Column 2, Lines 56-57, delete " $\bar{\lambda} = \sum_n P_n \lambda_n / P$ " and insert -- $\bar{\lambda} = \sum_n P_n \lambda_n / P$ --, therefor.

In Column 5, Lines 55-56, delete " $\bar{f} = \sum_n P_n f_n / P$ " and insert -- $\bar{f} = \sum_n P_n f_n / P$ --, therefor.

In Column 8, Line 34, in Claim 12, delete "carrier" and insert -- carried --, therefor.

Signed and Sealed this

Second Day of November, 2010

David J. Kappos
*Director of the United States Patent and Trademark Office*